United States Patent [19]

Minnick

[11] Patent Number: 5,021,495

[45] Date of Patent: Jun. 4, 1991

[54] POLYESTER MOLDING COMPOSITION HAVING IMPROVED FLAME RESISTANT

[75] Inventor: Larry A. Minnick, Bluff City, Tenn.

[73] Assignee: Eastman Kodak Company, Rochester, N.Y.

[21] Appl. No.: 617,842

[22] Filed: Nov. 23, 1990

[51] Int. Cl.$^5$ ............................................. C08K 5/03
[52] U.S. Cl. .................................... 524/410; 524/411; 524/412
[58] Field of Search ........................ 524/410, 411, 412

[56] References Cited

U.S. PATENT DOCUMENTS

| | | | |
|---|---|---|---|
| 4,338,243 | 7/1982 | Hecht et al. | 524/411 |
| 4,732,922 | 3/1988 | Kriek et al. | 524/412 |
| 4,837,254 | 6/1989 | Branscome | 524/411 |
| 4,879,328 | 11/1989 | Karasawa et al. | 524/304 |

FOREIGN PATENT DOCUMENTS 62-146948 6/1987 Japan.
62-146949 6/1987 Japan.
62-146950 6/1987 Japan.

*Primary Examiner*—Veronica P. Hoke
*Attorney, Agent, or Firm*—John F. Stevens; William P. Heath, Jr.

[57] ABSTRACT

Disclosed is a composition comprising a polyester of terephthalic acid, 1,4-butanediol and/or 1,4-cyclohexanedimethanol, a halogenated organic compound, an antimony compound and a polymer of at least one olefin which contains acid, anhydride or epoxide functional groups. The composition has improved flame resistance. Also disclosed is a method for improving the flame resistance of polymeric compositions.

7 Claims, No Drawings

POLYESTER MOLDING COMPOSITION HAVING IMPROVED FLAME RESISTANT

TECHNICAL FIELD

This invention relates to polyester molding compositions containing an additive system which enhances the flame retardancy thereof without detrimental loss of mechanical properties.

BACKGROUND OF THE INVENTION

Polyesters have been used as engineering plastics for mechanical parts of various machines, electrical equipment and parts of automobiles. Preferably, engineering plastics are provided with fire-proof or flame retardancy properties in addition to well-balanced physical and chemical properties. Such properties are indispensable in thermoplastic polyesters in order to enlarge their use as engineering plastics, because they are normally used at temperatures higher than 100° C.

Many times flame retarded (FR) glass fiber reinforced (GFR) formulations will drip flaming particles from a molded bar during the UL94 flammability test, especially at the thinner sections of 1/16 or 1/32 inch thickness. This dripping of flaming particles results in a V2 flammability rating instead of the desired V0 rating at a specific thickness.

Flame retarded poly(1,4-cyclohexylenedimethylene terephthalate) (PCT) drips flaming particles at the 1/32 inch thickness during the UL94 flammability test and therefore, only a V2 flammability rating can be obtained at this thickness. Unexpectedly, it has been found that the addition of selected modified polyolefins to PCT will prevent this dripping phenomena and allow V0 flammability ratings at the 1/32 inch thickness.

U.S. Pat. No. 4,879,328 discloses three component polyalkylene terephthalate blends containing selected epoxy compounds with ester linkages and selected elastomers. These are claimed to have improved mechanical properties (impact strength) and stability properties (oven, processing, and hydrolytic properties). This patent does not disclose flame retarded blends or improvements in flammability properties.

Japanese patents 62146948, 62146949, and 62146950 disclose blends of poly(ethylene terephthalate) with glycidyl-containing olefin polymers. These patents do not disclose improved flame resistance, nor do they mention PCT as a polyester component.

Generally speaking, flame retarding agents deteriorate the original physical properties of the base polymer, and therefore it is of importance to find a good combination of polymer and flame retarding agent. In respect to polyesters, several methods have been proposed. The use of antimony oxide in combination with brominated organic compounds is well known in the art of flame retarded polymers. Sodium antimonate used in combination with brominated organic compounds and used as a replacement for antimony oxide to enhance the flame retardancy of poly(ethylene terephthalate) is disclosed in U.S. Pat. No. 4,338,243.

Japanese Patent Publication No. 46-2086 discloses combined use of decabromodiphenyl ether and antimony trioxide as a flame retarding agent. According to this publication, it is possible to reduce the flammability characteristics of glass fiber reinforced polyester resin, but the polyester composition thus obtained is not satisfactory in many physical properties, especially heat deflection temperature, which is essential in certain applications such as electrical circuit boards, etc.

As mentioned above, the use of brominated flame retardants with antimony synergists is well known, and in unreinforced polyester compositions these are effective in extinguishing the flame. The composition still "drips", however, and thus will not attain an acceptable V0 rating in the Underwriters's Laboratories subject 94 test. Unexpectedly, it has been found that the use of certain modified polyolefins improves the flame retardancy of polybutylene terephthalate (PBT) and (PCT).

DESCRIPTION OF THE INVENTION

According to the present invention there is provided a composition of matter comprising
(a) a polyester containing repeat units from at least 90 mol % terephthalic acid and at least 90 mol % butanediol or 1,4-cyclohexanedimethanol based on 100 mol % dicarboxylic acid and 100 mol % glycol, said polyester having an I.V. of about 0.5 to about 1.3,
(b) about 5% to about 20%, based on the total composition weight, of a halogenated organic compound,
(c) about 1% to about 10%, based on the total composition weight, of an antimony compound, and
(d) about 1% to about 20%, based on the total composition weight of a polymer of at least one olefin containing 2-6 carbon atoms and about 1-30 weight %, based on the weight of said polymer, of acid, anhydride, or epoxide functional groups.

Further, according to the present invention there is provided a method of improving the flame retardancy of a composition comprising
(a) a polyester having repeat units from terephthalic acid and 1,4-butanediol, 1,4-cyclohexanedimethanol or blends thereof,
(b) a halogenated organic compound, and
(c) an antimony compound
said method comprising adding to the composition about 1% to about 20%, based on the total composition weight, a polymer of at least one olefin containing 2-6 carbon atoms, said polymer containing about 1-30 weight %, based on the weight thereof, of acid, anhydride, or epoxide functional groups.

Surprisingly, it has been found that the addition of an acid, anhydride or epoxide modified polyolefin to the polyesters improves flammability properties such as resistance to dripping and allows V0 flammability ratings at moldings of 1/32 inch in thickness. These compositions are especially useful in moldings in the electronics or electrical industry.

The polyesters, as well as the brominated compounds and antimony compounds described above are well-known in the art and many are commercially available. The term "polyester" is intended to include copolyesters.

The dicarboxylic acid component of the polyester may contain up to about 10 mol % of a modifying acid such as conventional aromatic, aliphatic or alicyclic dicarboxylic acids, for example, isophthalic acid, naphthalenedicarboxylic acid, cyclohexanedicarboxylic acid, succinic acid, sebacic acid, adipic acid, glutaric acid, azelaic acid and the like.

The glycol component may contain up to about 10 mol % of other conventional aliphatic or alicyclic glycols such as diethylene glycol, triethylene glycol, propanediol, pentanediol, hexanediol, and the like.

The polyesters useful in this invention can be prepared by processes well known in the art. For example, the polyesters can be prepared by direct condensation of terephthalic acid or ester interchange using dimethyl terephthalate with the selected glycol.

The flame retarding mixture comprises about 1–10 weight %, preferably about 3–6 weight % based on the total composition weight, of an antimony compound such as antimony oxide, antimony trioxide, sodium antimonate, powdered antimony, etc., which are commercially available. Preferably the antimony compound is sodium antimonate.

The flame retarding mixture further comprises about 5–20 weight %, preferably about 10 to 15 weight % based on the total composition weight, of an aromatic organic compound having at least one aromatic ring having halogen bonded directly to the aromatic ring. The halogenated compounds are preferably brominated or chlorinated, and most preferably, brominated. The bromine content, when bromine is present, is at least 25% of the weight of the compound, and the chlorine content, when chlorine is present, is at least 40% of the weight of the compound. In addition, it should be substantially stable at up to 300° C. and should not cause degradation of the polyester. When the compound contains bromine, the amount of bromine present in the blend should preferably be between 2–12% by weight of blend, and most preferably 5–10%. When the compound contains chlorine, the amount of the chlorine present should preferably be 3–20% by weight of the blend and most preferably 5–12%. Representative of such compounds are decabromodiphenyl ether, octabromodiphenyl ether, ethylene bis(tetrabromophthalimide), brominated polystyrene, poly(dibromophenylene oxide), a condensation product of two moles of tetrachlorocyclopentadiene and one mole of cyclooctadiene, and the like. Polymeric compounds may have molecular weights up to 200,000 or more.

The modified polyolefins may be copolymers of ethylene, propylene, or ethylene propylene that contain acid, anhydride, or epoxide functionality. These polyolefins may contain 1–30 weight % of acid, anhydride, or epoxide functionality. Additional comonomers not having these effective functionalities, such as acrylic esters and vinyl acetate, may also be components of the modified polyolefins. The most preferred polyolefins should contain 2–12% of acid, anhydride, or epoxide functionality. Examples of acid, anhydride, or epoxide functionality are acrylic acid, methacrylic acid, maleic anhydride, glycidyl acrylate, and glycidyl methacrylate.

The modified polyolefins are further characterized as having a melt flow of about 0.5 to 100 g/10 minutes at 190° C., preferably about 1 to 20 g/10 minutes.

When the polyolefin is modified with an acid, a typical generic structure would be

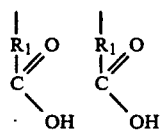

wherein R is a polyvalent bridging radical containing at least one hydrocarbon group.

When the polyolefin is modified with an anhydride, a typical generic structure would be

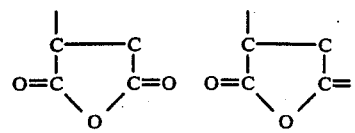

When the polyolefin is modified with an epoxide, a typical generic structure would be

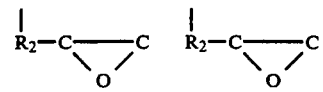

wherein $R_2$ is a polyvalent bridging radical containing at least one hydrocarbon group.

A preferred reinforcing filler is glass fibers which may be introduced into the composition as chopped glass fibers or continuous glass fiber rovings in amounts of about 10–50% by weight of the composition. Other reinforcing materials such as metal fibers, graphite fibers, aramid fibers, glass beads, aluminum silicate, asbestos, mica, talc and the like may be used in combination with, or in place of the glass fibers.

Substantially any of the types of glass fibers generally known and/or used in the art are useful in the present invention. Typical types are those described in British Patent No. 1,111,012, U.S. Pat. No. 3,368,995 and German Auslegeschrift No. 2,042,447. Thus, the average length of useful fibers covers a wide range, for example, about 1/16 to about 2 inches. The presently preferred glass fibers have an average length of about 1/16 to about ¼ inch.

Glass filaments made of calcium-aluminum-boron silicate glass, which is relatively free from sodium carbonate, are preferably used. Glass of this type is known as "E" glass; however, where the electrical properties of the reinforced polyesters are not important, other glasses can also be used, for example the glass with a low sodium carbonate content which is known as "C" glass. The diameters of the filaments can be in the range from about 0.003 to 0.18 mm, but this is not critical for the present invention.

In addition to the components discussed hereinabove, the blends of this invention may contain additives commonly employed with polyester resins, such as colorants, mold release agents, antioxidants, tougheners, nucleating agents, crystallization aids, plasticizers, ultraviolet light and heat stabilizers and the like.

The blends of this invention are prepared by blending the components together by any convenient means to obtain an intimate blend. Compounding temperatures must be at least the melting point of the polyester. For example, the polyester can be mixed dry in any suitable blender or tumbler with the other components and the mixture melt-extruded. The extrudate can be chopped. If desired the reinforcing material can be omitted initially and added after the first melt extrusion, and the resulting mixture can then be melt extruded. The product is especially suitable as an injection molding material for producing molded articles.

The following examples are submitted for a better understanding of the invention.

The flame retarded (FR) glass fiber reinforced (GFR) PCT blends of this invention were prepared by extrusion compounding using a 1.5 inch Sterling single screw extruder (L/D=36/1) at temperatures of 300° C. The resulting pellets were injection molded into tensile and flexural bars for use in mechanical and flammability property testing.

Example 1 is a blend of FR GFR PCT (PCT/30% Owens Corning 492AA glass fiber/3.75% Benzoflex S312/0.25% Irganox 1010/12% Pyrochek 68PB/5% Thermoguard FR/0.5% Polywax 1000). This blend has excellent mechanical properties, but only has a UL94 flammability rating of V2 at 1/32 inch thickness (see Tables 1 and 2).

Examples 2-6 are blends of FR GFR PCT containing 1-5% of a polyethylene modified with 28% acrylic ester and 4% glycidyl methacrylate (Lotader 8660). These blends have excellent mechanical properties and the blends containing 2-5% Lotader 8660 have V0 flammability ratings at 1/32 inch thickness. Examples 7-8 are blends of FR GFR PCT containing 5% of polyethylene modified with glycidyl methacrylate (Sumitomo Bondfast 2C and E). These blends also have excellent mechanical properties and V0 flammability ratings at 1/32 inch thickness. Examples 9-10 are blends of FR GFR PCT containing 5% unmodified polyethylene (Tenite 800E and 200P). These blends also have excellent mechanical properties, but only V2 flammability ratings at 1/32 inch thickness.

Examples 11-12 are blends of FR GFR PCT containing 5% of either polyethylene containing acrylic ester and 1.5-3.0 maleic anhydride (Lotader 3700) or polyethylene containing 16% methacrylic acid (Nucrel 010). These blends have V0 flammability ratings at 1/32 inch thickness.

Examples 13-14 are blends of FR GFR PCT containing 5% of either polyethylene containing 27-29% vinyl acetate (Elvax 260) or polyethylene containing 14% methacrylic acid that is 40% neutralized with sodium. These blends have V2 flammability ratings at 1/32 inch thickness.

Examples 15-17 are blends of FR GFR PCT containing 5% of either polypropylene (Shell 5C14), polypropylene containing 0.1% maleic anhydride (Himont PC072PM), or polypropylene containing 6% acrylic acid (BP Chemical Polybond 1001). The blend containing polypropylene with acrylic acid comonomer has a V0 flammability rating at 1/32 inch thickness, while those blends containing the other polypropylenes only have V2 ratings at 1/32 inch thickness.

These examples demonstrate that the flammability properties of FR GFR PCT are improved by the addition of modified polyolefins containing acid, anhydride, or epoxide functionality. The use of polyolefins with glycidyl methacrylate functionality are most preferred for enhancing the flammability properties of FR GFR PCT.

Benzoflex S312—neopentyl glycol dibenzoate, Velsicol Chemical Company
Irganox 1010—hindered phenolic stabilizer, Ciba-Geigy
Pyrochek 68PB—brominated polystyrene, Ferro Corporation
Thermoguard FR—sodium antimonate, M & T Chemical
Polywax 1000—1000 molecular weight polyethylene, Petrolite Corporation
OC 408BC—Owens Corning glass fiber, 3/16 inch chopped strand
Lotader 8660—Polyethylene/28% acrylic ester/4% glycidyl methacrylate

TABLE 1

Effect of Selected Modified Polyolefins on the Properties of FR GFR FCT

| Example | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|
| Polyolefin Type | — | C | C | C | C | C | D | E | A | B | F | G | H | I | J | K | L |
| % Polyolefin | — | 1 | 2 | 3 | 4 | 5 | 5 | 5 | 5 | 5 | 5 | 5 | 5 | 5 | 5 | 5 | 5 |
| Tensile Strength 10**3 psi | 20.4 | 20.1 | 19.8 | 19.5 | 18.8 | 18.4 | 18.8 | 18.3 | 18.1 | 18.0 | 14.5 | 12.2 | 18.4 | 13.0 | 17.8 | 17.7 | 15.4 |
| % Elongation | 4 | 4 | 4 | 4 | 4 | 4 | 4 | 4 | 3 | 3 | 3 | 2 | 4 | 2 | 3 | 3 | 3 |
| Flexural Strength 10**3 psi | 26.5 | 25.3 | 26.0 | 25.8 | 24.9 | 24.8 | 24.8 | 23.6 | 24.4 | 24.2 | 17.9 | 26.8 | 20.1 | 20.7 | 24.3 | 23.7 | 21.0 |
| Flexural Modulus 10**5 psi | 12.6 | 11.9 | 12.7 | 12.2 | 12.3 | 11.5 | 11.8 | 11.4 | 11.8 | 11.4 | 11.5 | 13.3 | 10.8 | 11.9 | 12.6 | 12.3 | 12.7 |
| Notched Izod Impact ft-lb/in | 1.1 | 1.2 | 1.3 | 1.3 | 1.3 | 1.4 | 1.2 | 1.2 | 1.3 | 1.3 | 1.1 | 1.0 | 1.1 | 1.1 | 1.1 | 1.2 | 1.0 |
| Unnotched Izod Impact ft-lb/in | 9.7 | 10.5 | 10.5 | 12.7 | 12.9 | 12.8 | 10.4 | 11.8 | 10.1 | 9.7 | 8.9 | 7.8 | 9.8 | 8.4 | 8.8 | 10.2 | 7.7 |
| Heat Deflection Temperature at 264 psi, C | 255 | 251 | 253 | 253 | 252 | 249 | 253 | 259 | 254 | 253 | 244 | 257 | 246 | 250 | 259 | 259 | 259 |
| UL94 Flammability Rating at 1/32 inch thickness | V2 | V2 | V0 | V0 | V0 | V0 | V0 | V0 | V2 | V2 | V0 | V0 | V2 | V2 | V2 | V2 | V0 |

TABLE 2

Composition and Melt Flow of Selected Polyolefins

| Polyolefin Type | Supplier/Trademark | Composition | Melt Flow* |
|---|---|---|---|
| A | EASTMAN TENITE 800E | Polyethylene | 2.1 |
| B | EASTMAN TENITE 200P | Polyethylene | 8.9 |
| C | Sartomer Lotader 8660 | Polyethylene/28% acrylic ester/ 4% glycidyl methacrylate | 4 |
| D | Sumitomo Bondfast 2C | Polyethylene/6% glycidyl methacrylate | 2.9 |
| E | Sumitomo Bondfast E | Polyethylene/12% glycidyl methacrylate | 2.3 |
| F | Sartomer Lotader 3700 | Polyethylene/acrylic ester/ 1.5-3.0% maleic anhydride** | 5 |

TABLE 2-continued

Composition and Melt Flow of Selected Polyolefins

| Polyolefin Type | Supplier/Trademark | Composition | Melt Flow* |
|---|---|---|---|
| G | Dupont Nucrel 010 | Polyethylene/16% methacrylic acid | 11 |
| H | Dupont Elvax 260 | Polyethylene/27-29% vinyl acetate | 5-7 |
| I | Dupont Surlyn 8527 | Polyethylene/14% methacrylic acid/ 40% sodium neutralized | 1 |
| J | Shell 5C14 | Polypropylene | — |
| K | Himont PC072PM | Polypropylene/0.1% maleic anhydride | — |
| L | BP Chemical Polybond 1001 | Polypropylene/6% acrylic acid | — |

*Melt flow is g/10 minutes at 190° C., using a load of 2160 g and 0.0825 in. orifice
**Comonomer content is a total of 32%

Items I and II in the table below show that the addition of 4% Lotader 8660 to a glass reinforced PBT blend improves its 1/16" flammability rating from V2 to V0. The mechanism is by stopping the dripping during burning.

The PBT using in these blends may have an inherent viscosity of from about 0.5 to about 1.3.

|  | I | II |
|---|---|---|
| Molding Temperature, °C. | 270 | 270 |
| Injection Pressure, psig | 750 | 750 |
| Tensile | | |
| Break Stress, 10E3 psi | 13.48 | 15.37 |
| Break Elongation, % | 3 | 3 |
| Flexural | | |
| Strength, 10E3 psi | 19.80 | 21.89 |
| Modulus, 10E5 psi | 12.69 | 11.70 |
| Notched Izod, ft lb/in | 1.01 | 1.87 |
| Unnotched Izod, ft lb/in | 6.02 | 12.13 |
| HDT, °C. 264 psi | 209 | 208 |
| UL 94 | | |
| 1/16" | V2 | V0 |
| 1/32" | V2 | V2 |

The tests used herein for determination of mechanical properties are described as follows:

| Tensile Strength | ASTM D638-80 |
|---|---|
| Elongation at Fracture | ASTM D638-80 |
| Flexural Modulus | ASTM D790-80 |
| Flexural Strength | ASTM D790-80 |
| Izod Impact | ASTM D256-81 |
| Heat Deflection Temperature, °C. | ASTM D648-72 |

Unless otherwise specified, all parts, percentages, ratios, etc., are by weight. Weight of reinforcing glass fibers and nucleating agent(s) are based on total composition weight.

The term "UL 94" is a standard Underwriter's Laboratory test well known to those skilled in the art. A rating of "V0" means that a flame will self-extinguish within 10 seconds after each ignition without dripping molten polymer. A rating of "V2" means that a flame will self-extinguish within 30 seconds after each ignition and may have flaming drips which ignite dry absorbent surgical cotton.

The term "melt flow" is used herein as the amount in grams of a thermoplastic resin which can be forced through a given orifice under a specified load and temperature within 10 minutes, determined in accordance with ASTM D1238.79.

I.V. is measured at 25° C. using 0.50 gram of polymer per 100 ml of a solvent consisting of 60 percent by weight phenol and 40 percent by weight tetrachloroethane.

I claim:

1. A composition of matter comprising
   (a) a polyester containing repeat units from at least 90 mol % terephthalic acid and at least 90 mol % butanediol or 1,4-cyclohexanedimethanol based on 100 mol % dicarboxylic acid and 100 mol % glycol, said polyester having an I.V. of about 0.5 to about 1.3,
   (b) about 5% to about 20%, based on the total composition weight, of a halogenated organic compound,
   (c) about 1% to about 10%, based on the total composition weight, of an antimony compound, and
   (d) about 1% to about 20%, based on the total composition weight, of a polymer of at least one olefin containing 2-6 carbon atoms and about 1-30 weight %, based on the weight of said polymer, of acid, anhydride, or epoxide functional groups.

2. A composition according to claim 1 which further comprises up to about 50% by weight of the composition of a reinforcing material.

3. A composition according to claim 1 wherein said polyester contains repeat units from at least 90 mol % terephthalic acid and at least 90 mol % 1,4-butanediol.

4. A composition according to claim 1 wherein said polyester contains repeat units from at least 90 mol % terephthalic acid and at least 90 mol % 1,4-cyclohexanedimethanol.

5. A composition according to claim 1 wherein said acid, anhydride or epoxide functional groups are selected from acrylic acid, methacrylic acid, maleic anhydride, glycidyl acrylate, and glycidyl methacrylate.

6. The method of improving the flame retardancy of a composition comprising
   (a) a polyester having repeat units from terephthalic acid, 1,4-butanediol or 1,4-cyclohexanedimethanol,
   (b) a halogenated organic compound, and
   (c) an antimony compound
said method comprising adding to said composition and about 1% to about 20%, based on the total composition weight of a polymer of at least one olefin containing 2-6 carbon atoms and about 1-30 wt %, based on the weight of said polymer, of acid, anhydride, or epoxide functional groups 7. The method according to claim 6 wherein said acid, anhydride or epoxide functional groups are selected from acrylic acid, methacrylic acid, maleic anhydride, glycidyl acrylate, and glycidyl methacrylate.

* * * * *